(12) United States Patent
Fox et al.

(10) Patent No.: US 12,539,635 B2
(45) Date of Patent: Feb. 3, 2026

(54) FOOD PRODUCT SLICING APPARATUS HAVING A PRODUCT GATE ASSEMBLY AND METHOD OF OPERATING SAME

(71) Applicant: Provisur Technologies, Inc., Chicago, IL (US)

(72) Inventors: Gage Allen Fox, Manhattan, IL (US); Ryan J. O'Connor, Clarendon Hills, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 200 days.

(21) Appl. No.: 18/308,114

(22) Filed: Apr. 27, 2023

(65) Prior Publication Data
US 2023/0347542 A1    Nov. 2, 2023

Related U.S. Application Data
(60) Provisional application No. 63/336,479, filed on Apr. 29, 2022.

(51) Int. Cl.
*B26D 7/01* (2006.01)

(52) U.S. Cl.
CPC .......... *B26D 7/01* (2013.01); *B26D 2007/011* (2013.01); *B26D 2210/02* (2013.01)

(58) Field of Classification Search
CPC ............... B26D 7/01; B26D 2007/011; B26D 2210/02; B26D 7/0625; B26D 7/0633
See application file for complete search history.

(56) References Cited

U.S. PATENT DOCUMENTS

| | | | |
|---|---|---|---|
| 2,103,567 | A | 12/1937 | Berkel |
| 3,729,774 | A | 5/1973 | Chow |
| 3,846,957 | A | 11/1974 | Divan |
| 3,848,491 | A | 11/1974 | Flesch |
| 4,356,205 | A | 10/1982 | Richards |
| 4,428,263 | A | 1/1984 | Lindee et al. |
| 4,712,458 | A | 12/1987 | Mally |
| 4,745,681 | A | 5/1988 | Hollis et al. |
| 4,763,738 | A | 8/1988 | Kuchler |

(Continued)

FOREIGN PATENT DOCUMENTS

| | | |
|---|---|---|
| DE | 8129776 U1 | 4/1982 |
| DE | 19837644 A1 | 2/2000 |

(Continued)

OTHER PUBLICATIONS

International Search Report and Written Opinion for PCT/US2023/66290 mailed dated Jan. 29, 2024, 16 pages.

(Continued)

*Primary Examiner* — Jennifer S Matthews
*Assistant Examiner* — Ella L Keena
(74) *Attorney, Agent, or Firm* — Klintworth & Rozenblat LLP

(57) ABSTRACT

A food product slicing apparatus includes a frame, a tray mounted on the frame and configured to support food product blocks, a product gate assembly mounted on the frame and configured to support front ends of the food product blocks, and a gripper assembly mounted on the frame and configured to grip rear ends of the food product blocks. The product gate assembly is moved from an up position to a down position using a camming action.

25 Claims, 11 Drawing Sheets

(56) References Cited

U.S. PATENT DOCUMENTS

| | | |
|---|---|---|
| 5,042,340 A | 8/1991 | Kasper |
| 5,065,656 A | 11/1991 | Flisram |
| 5,117,717 A | 6/1992 | Mally |
| 5,129,298 A | 7/1992 | Cresson et al. |
| 5,164,777 A | 11/1992 | Agarwal et al. |
| 5,169,221 A | 12/1992 | Wheeler |
| 5,271,340 A | 12/1993 | Whitney |
| 5,481,466 A | 1/1996 | Carey |
| 5,564,554 A | 10/1996 | Lawrence |
| 5,628,237 A | 5/1997 | Lindee et al. |
| 5,704,265 A | 1/1998 | Johnson et al. |
| 5,724,874 A | 3/1998 | Lindee et al. |
| 5,787,776 A | 8/1998 | Nishimoto |
| 5,787,801 A | 8/1998 | Kirk et al. |
| 5,875,697 A | 3/1999 | Cole et al. |
| 5,974,925 A | 11/1999 | Lindee et al. |
| 5,988,033 A | 11/1999 | Skaar et al. |
| 6,164,174 A | 12/2000 | Sigurdsson et al. |
| 6,484,615 B2 | 11/2002 | Lindee |
| 6,532,851 B2 | 3/2003 | Moss et al. |
| 6,585,580 B1 | 7/2003 | Hergott et al. |
| 6,591,723 B1 | 7/2003 | Jung |
| 6,763,750 B2 | 7/2004 | Lindee |
| 6,883,409 B1 | 4/2005 | Spix et al. |
| 7,073,419 B2 | 7/2006 | Weber |
| 7,089,840 B2 | 8/2006 | Freudinger et al. |
| 7,270,039 B2 | 9/2007 | Lindee et al. |
| 7,278,344 B2 | 10/2007 | Pryor et al. |
| 7,299,728 B2 | 11/2007 | Ferrin et al. |
| 7,306,444 B2 | 12/2007 | Heinzen et al. |
| 7,377,201 B2 | 5/2008 | Chen |
| 7,600,459 B2 | 10/2009 | Bodey et al. |
| 7,603,936 B2 | 10/2009 | Pryor et al. |
| 7,623,249 B2 | 11/2009 | Sandberg et al. |
| 7,866,130 B2 | 1/2011 | Drebing et al. |
| 8,091,458 B2 | 1/2012 | Culling |
| 8,109,065 B2 | 2/2012 | Drebing et al. |
| 8,109,186 B2 | 2/2012 | Culling |
| 8,250,955 B2 | 8/2012 | Sandberg et al. |
| 8,336,434 B2 | 12/2012 | Sandberg et al. |
| 8,408,108 B2 | 4/2013 | Redemann et al. |
| 8,408,109 B2 | 4/2013 | Lindee et al. |
| 8,473,094 B2 | 6/2013 | Becker et al. |
| 8,596,175 B2 | 12/2013 | Weber |
| 8,616,099 B2 | 12/2013 | Hallvardsson et al. |
| 8,777,284 B2 | 7/2014 | Schaller et al. |
| 8,812,146 B2 | 8/2014 | Einarsson et al. |
| 8,850,938 B2 | 10/2014 | Lindee et al. |
| 8,869,664 B2 | 10/2014 | Eyles et al. |
| 8,978,529 B2 * | 3/2015 | Pasek .................... B26D 7/225 83/761 |
| 9,061,432 B2 | 6/2015 | Reifenhaeuser |
| 9,062,689 B2 | 6/2015 | Schaaf |
| 9,095,144 B1 | 8/2015 | Sekerak et al. |
| 9,173,431 B2 | 11/2015 | Kodali |
| 9,272,428 B2 | 3/2016 | Muller et al. |
| 9,296,120 B2 | 3/2016 | Mclaughlin et al. |
| 9,375,859 B2 | 6/2016 | Weber |
| 9,381,660 B2 | 7/2016 | Schaub |
| 9,399,531 B2 | 7/2016 | Pryor et al. |
| 9,457,487 B2 | 10/2016 | Mayer |
| 9,597,812 B2 | 3/2017 | Schmeiser |
| 9,764,490 B2 | 9/2017 | Weber |
| 9,789,621 B2 | 10/2017 | Hsu |
| 9,950,869 B1 | 4/2018 | Pryor et al. |
| 10,160,602 B2 | 12/2018 | Torrenga et al. |
| 10,307,927 B2 * | 6/2019 | Mayer .................. B26D 7/0683 |
| 10,625,436 B2 | 4/2020 | Lindee et al. |
| 10,850,416 B2 | 12/2020 | Schmeiser et al. |
| 10,974,409 B2 | 4/2021 | Pryor et al. |
| 11,148,313 B2 | 10/2021 | Ernéet al. |
| 2002/0098791 A1 | 7/2002 | Handel et al. |
| 2004/0035276 A1 | 2/2004 | Weber |
| 2005/0132864 A1 | 6/2005 | Biggs et al. |
| 2006/0075859 A1 | 4/2006 | Willett |
| 2006/0219069 A1 | 10/2006 | Skaar et al. |
| 2008/0000337 A1 | 1/2008 | Dickover et al. |
| 2008/0016999 A1 | 1/2008 | Mathues et al. |
| 2008/0196566 A1 | 8/2008 | Culling |
| 2008/0196603 A1 | 8/2008 | Culling |
| 2009/0120256 A1 | 5/2009 | Pasek |
| 2009/0188357 A1 | 7/2009 | Lindee et al. |
| 2009/0188363 A1 | 7/2009 | Lindee et al. |
| 2010/0288093 A1 | 11/2010 | Seager et al. |
| 2010/0307303 A1 | 12/2010 | Weber |
| 2010/0307304 A1 | 12/2010 | Weber |
| 2011/0126680 A1 | 6/2011 | Weber |
| 2011/0247466 A1 | 10/2011 | Weber |
| 2011/0265621 A1 | 11/2011 | Schmidt |
| 2011/0265624 A1 * | 11/2011 | Pasek .................... B26D 7/225 83/409 |
| 2012/0060659 A1 | 3/2012 | Weber |
| 2012/0073415 A1 | 3/2012 | Maidel et al. |
| 2012/0085216 A1 | 4/2012 | Lobbia et al. |
| 2012/0086226 A1 | 4/2012 | Weber |
| 2012/0212603 A1 | 8/2012 | Lindee et al. |
| 2012/0312135 A1 | 12/2012 | Schaub |
| 2013/0019722 A1 | 1/2013 | Eyles et al. |
| 2013/0104709 A1 | 5/2013 | Rother |
| 2013/0108409 A1 | 5/2013 | Wu et al. |
| 2013/0139665 A1 | 6/2013 | Sperry et al. |
| 2014/0144303 A1 | 5/2014 | Muller |
| 2014/0208917 A1 | 7/2014 | Whitney |
| 2014/0262669 A1 | 9/2014 | Conti et al. |
| 2014/0338509 A1 | 11/2014 | Lindee et al. |
| 2014/0352505 A1 | 12/2014 | Grasselli |
| 2015/0013516 A1 | 1/2015 | Bifulco |
| 2015/0122095 A1 | 5/2015 | Schmeiser |
| 2015/0135921 A1 | 5/2015 | Martinez-Montes |
| 2015/0202786 A1 | 7/2015 | Mayer et al. |
| 2015/0321371 A1 | 11/2015 | Mueller |
| 2015/0321372 A1 | 11/2015 | Fox et al. |
| 2016/0144527 A1 | 5/2016 | Achenbach et al. |
| 2016/0271822 A1 | 9/2016 | Burk et al. |
| 2017/0259448 A1 | 9/2017 | Weber et al. |
| 2018/0186022 A1 * | 7/2018 | Fox .......................... B26D 3/28 |
| 2022/0032487 A1 | 2/2022 | Bauer et al. |

FOREIGN PATENT DOCUMENTS

| | | | |
|---|---|---|---|
| DE | 10135846 A1 | 2/2003 | |
| DE | 102019120314 A1 | 1/2021 | |
| EP | 0713753 A2 | 5/1996 | |
| EP | 3466624 A1 | 4/2019 | |
| EP | 3835017 A1 * | 6/2021 | ............. B26D 5/007 |
| KR | 20100028414 A * | 10/2011 | ............... B26D 1/29 |
| WO | WO2006024467 A2 | 3/2006 | |

OTHER PUBLICATIONS

European Office Action issued in EP application No. 23797537.0 dated May 26, 2025, 04 pages.

* cited by examiner

FOOD PRODUCT SLICING APPARATUS HAVING A PRODUCT GATE ASSEMBLY AND METHOD OF OPERATING SAME

CROSS-REFERENCE TO RELATED APPLICATION

This application claims priority to U.S. provisional application Ser. No. 63/336,479 filed Apr. 29, 2022, the contents of which are incorporated herein in its entirety.

FIELD OF THE INVENTION

The present disclosure generally relates to an apparatus for slicing food products and, more particularly, to improvements to an apparatus for slicing food products.

BACKGROUND

Food product slicing machines have existed for some time and are used to slice various food products at a high speed rate. Exemplary food products include meat, such as beef, chicken, fish, pork, etc., and cheese. Various deficiencies have been identified with such food product slicing machines.

Conventional food product slicing machines include a product gate that holds back a food product block (typically a large block of frozen food product having a relatively significant weight) and a gripper that grips a rear of the food product block. When the food product gate is lowered, the gripper is the only mechanism retaining the food product block and preventing the food product block from moving forward toward a slicing station where the food product block is ultimately sliced by a blade. Due to the significant weight of the food product block, the gripper often fails and the heavy food product block may fall or advance forward out of control of any mechanism of the slicing machine. The free-falling food product block may damage components of the slicing machine and/or become misaligned, thereby inhibiting operation of the slicing machine.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
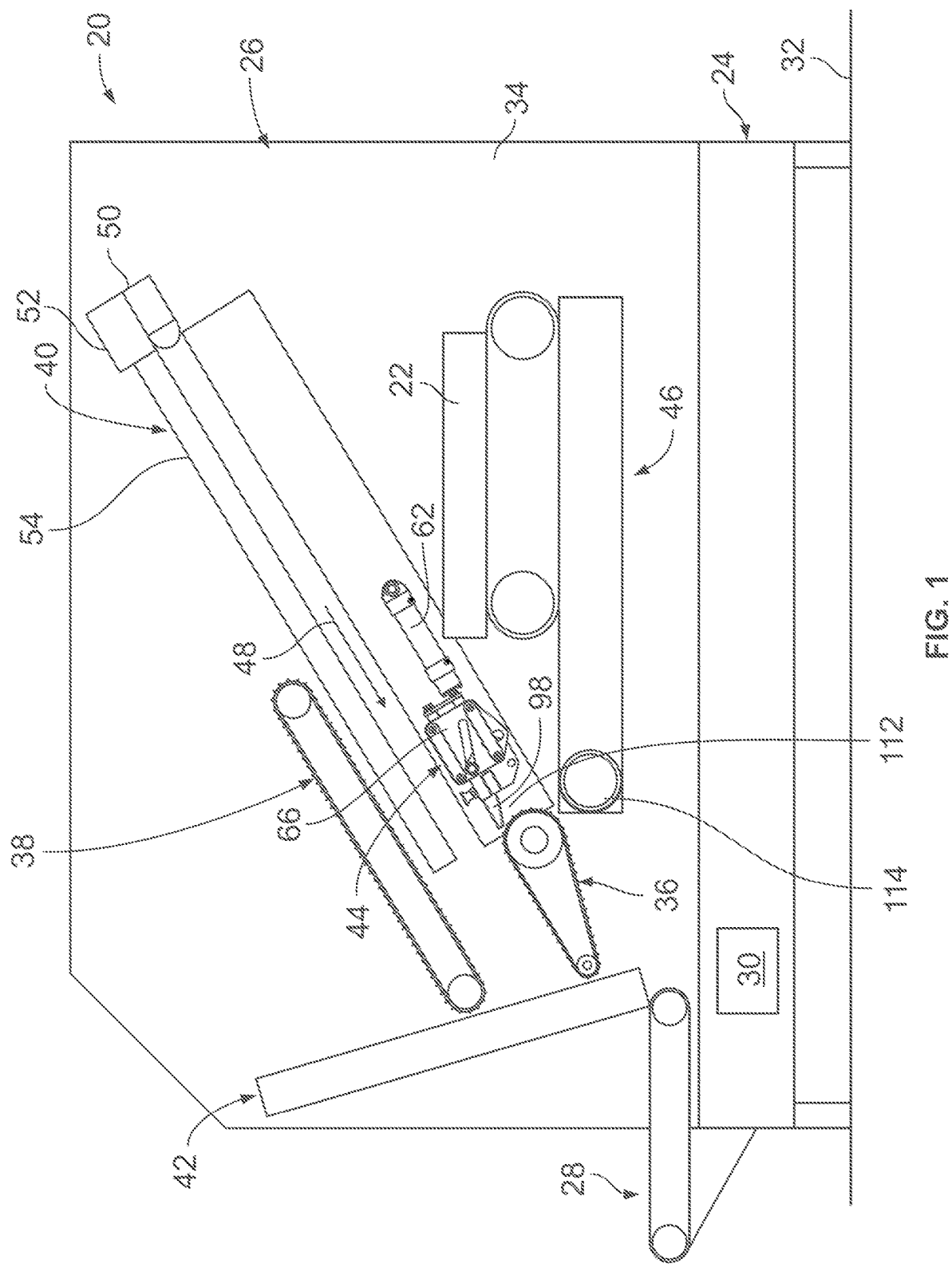
FIG. 1 is a schematic view of a food product slicing apparatus including a product gate assembly in accordance with the present disclosure.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

With reference to the figures, one example of a food product slicing apparatus 20 is shown. The food product slicing apparatus 20 is used to slice food product blocks 22 into slices. The food product blocks 22 may be comprised of a wide variety of edible materials including, but not limited to meat, such as beef, chicken, fish, pork, etc., and cheese. In some examples, the food product blocks 22 are frozen.

The food product slicing apparatus 20 includes a base 24, an input and slicing portion 26 pivotally mounted on the base 24, an output portion 28 mounted on the base 24 and downstream of the input and slicing portion 26, and a control system 30 configured to control operation of the food product slicing apparatus 20. The control system 30 may be mounted on the base 24. The base 24 supports the input and slicing portion 26, the output portion 28, and the control system 30 on a ground surface 32 and includes various mechanisms and power systems for powering the food product slicing apparatus 20. The input and slicing portion 26 is configured to support and handle the food product blocks 22, to move the food product blocks 22, and to slice the food product blocks 22 into slices. The sliced food product is supported on the output portion 28 of the food product slicing apparatus 20 in stacks or shingles and is moved away from the input and slicing portion 26 by the output portion 28. The control system 30 includes all the necessary hardware and software to perform all of the operations and functions of the food product slicing apparatus 20.

With reference to FIG. 1, the input and slicing portion 26 includes a frame 34 extending from the base 24, a lower drive assembly 36 mounted on the frame 34, an upper drive assembly 38 mounted on the frame 34, a gripper assembly 40 mounted on the frame 34 and which is movable relative to the frame 34 and relative to the lower and upper drive assemblies 36, 38, a shear edge and slicing station 42 mounted on the frame 34 downstream of the lower and upper drive assemblies 36, 38, a product gate assembly 44 mounted on the frame 34 upstream of the lower drive assembly 36 and below the upper drive assembly 38, and a tray 46 pivotally mounted on the frame 34 and which is upstream of the product gate assembly 44.

The upper drive assembly 38 is partially above the lower drive assembly 36, and extends upstream of the lower drive assembly 36. The lower drive assembly 36 may include a plurality of endless drive belts, one for each food product block 22, at least one of which is driven. The endless drive belts of the lower drive assembly 36 define planar upper surfaces upon which food product blocks 22 will translate.

The upper drive assembly 38 may include a plurality of endless drive belts, one for each food product block 22, at least one of which is driven. The endless drive belts of the upper drive assembly 38 define lower surfaces along which food product blocks 22 will translate. The drive belts may include a tactile surface configured to engage surfaces of the food product blocks 22. The upper drive assembly 38 may include pressure adjustment assemblies (not shown) to apply varying pressures to top surfaces of the food product blocks 22 as food product blocks 22 engage with the lower drive assembly 36. A height adjustment assembly (not shown) may be provided to adjust the height of the upper drive assembly 38 relative to the frame 34 and relative to the lower drive assembly 36. The lower and upper drive assemblies 36, 38 move food product blocks 22 from the tray 46 to the shear edge and slicing station 42 along a food path 48. The lower and upper drive assemblies 36, 38 are angled relative to the horizontal.

The gripper assembly 40 includes a plurality of grippers 50 mounted on a housing 52. The housing 52 is slidably mounted on rails 54 (only one of which is shown) of the frame 34. An adjustment mechanism (not shown) is mounted on the frame 34 and is used to move the housing 52 along the rails 54 toward and away from the lower and upper drive assemblies 36, 38. The grippers 50 engage with rear ends of the food product blocks 22, and the housing 52 is configured to pass between the lower and upper drive assemblies 36, 38. In an embodiment, the grippers 50 are in line with a longitudinal centerline of the food product blocks 22.

The shear edge and slicing station 42 is conventional and the specifics are not described herein. The slicing station 42 includes a blade which moves upwardly and downwardly relative to a shear bar defining the shear edge to slice the food product blocks 22 into individual slices.

With initial reference to FIGS. 2, 3, 5 and 6, the product gate assembly 44 includes a pair of linearly extending actuators 60, 62 having an upstream end 60a, 62a and a downstream end 60b, 62b, a cam plate 64, 66 fixedly mounted to the downstream end 60b, 62b of each actuator 60, 62, a bridge 68 extending between the cam plates 64, 66 and being movable relative thereto, and a blade cartridge 70 removably coupled to the bridge 68. The actuators 60, 62 may be pneumatic cylinders. The upstream end 60a, 62a of the actuators 60, 62 are fixedly coupled to the frame 34 upstream of the lower drive assembly 36, and below the upper drive assembly 38.

Figure 8:
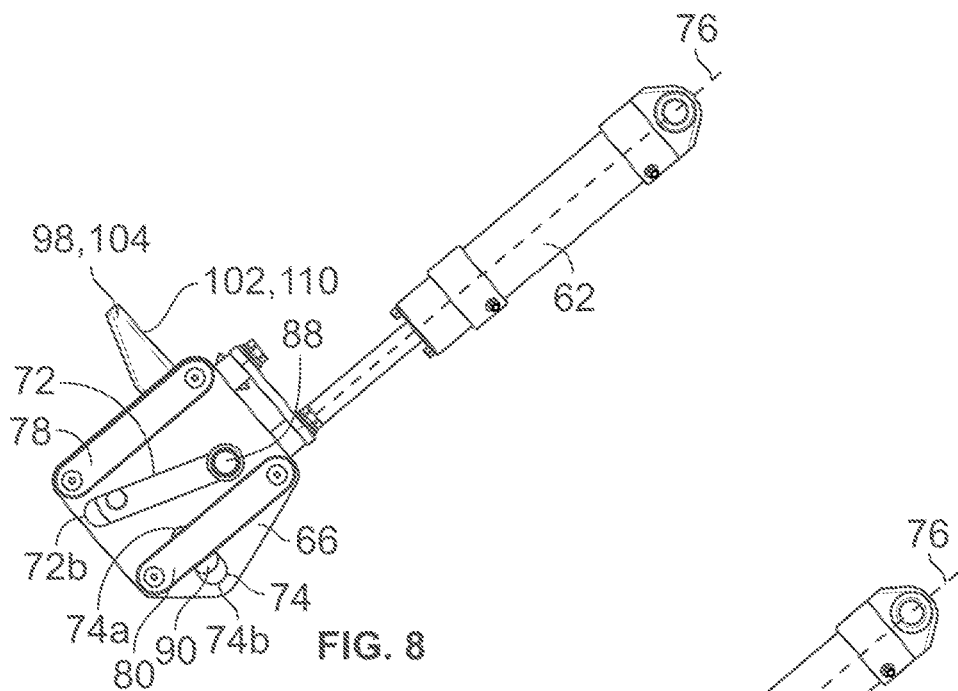
FIGS. 8-10 are side elevation views of the product gate assembly in various positions.
Figure 9:
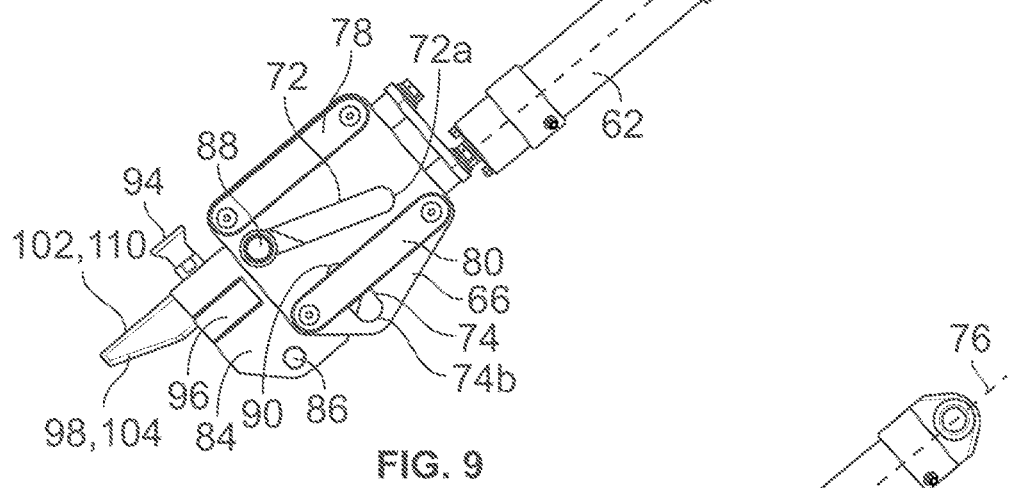
Figure 10:
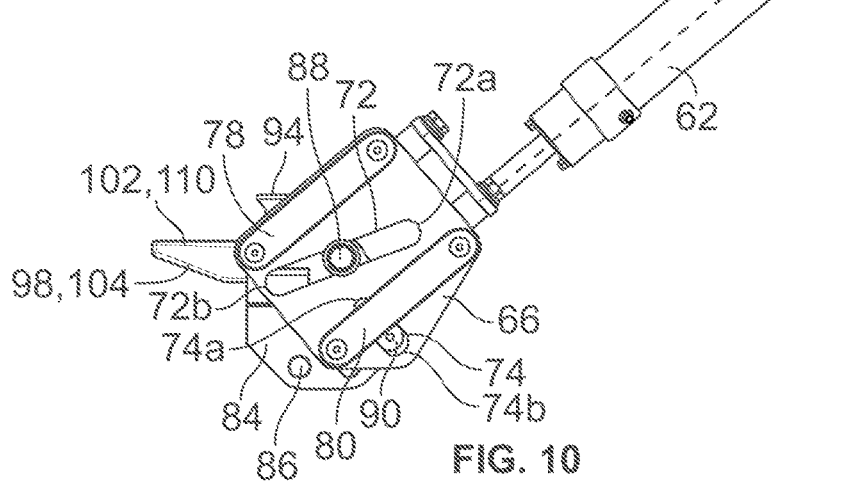

As shown in FIGS. 8-10, each cam plate 64, 66 has a first cam track 72 and a second cam track 74, each of which is formed as an elongated slot. The first cam track 72 of each cam plate 64, 66 is linear and has an upstream end 72a generally longitudinally aligned with the centerline 76 of the respective actuator 60, 62 to which it is attached, and a downstream end 72b spaced at an angle relative to a line parallel to the centerline 76 of the respective actuator 60, 62 to which it is attached. In an embodiment, the angle is 40 degrees. The second cam track 74 of each cam plate 64, 66 is linear and extends perpendicular to the centerline 76 of the respective actuator 60, 62 to which it is attached. The second cam track 74 is below the first cam track 72 in each cam plate 64, 66. An upper end 74a of the second cam track 74 is positioned at approximately the midpoint of the first cam track 72 and is generally longitudinally aligned with the centerline 76 of the respective actuator 60, 62 to which it is attached. Each cam plate 64, 66 has first and second projections 78, 80 which extend outwardly from outer side surfaces of the cam plates 64, 66. The first and second projections 78, 80 seat within elongated slots (not shown) on the frame 34 which allow the cam plates 64, 66 to slide relative to the frame 34 when moved by the actuators 60, 62. The cam plates 64, 66 can slide toward and away from the shear edge and slicing station 42.

Figure 7:
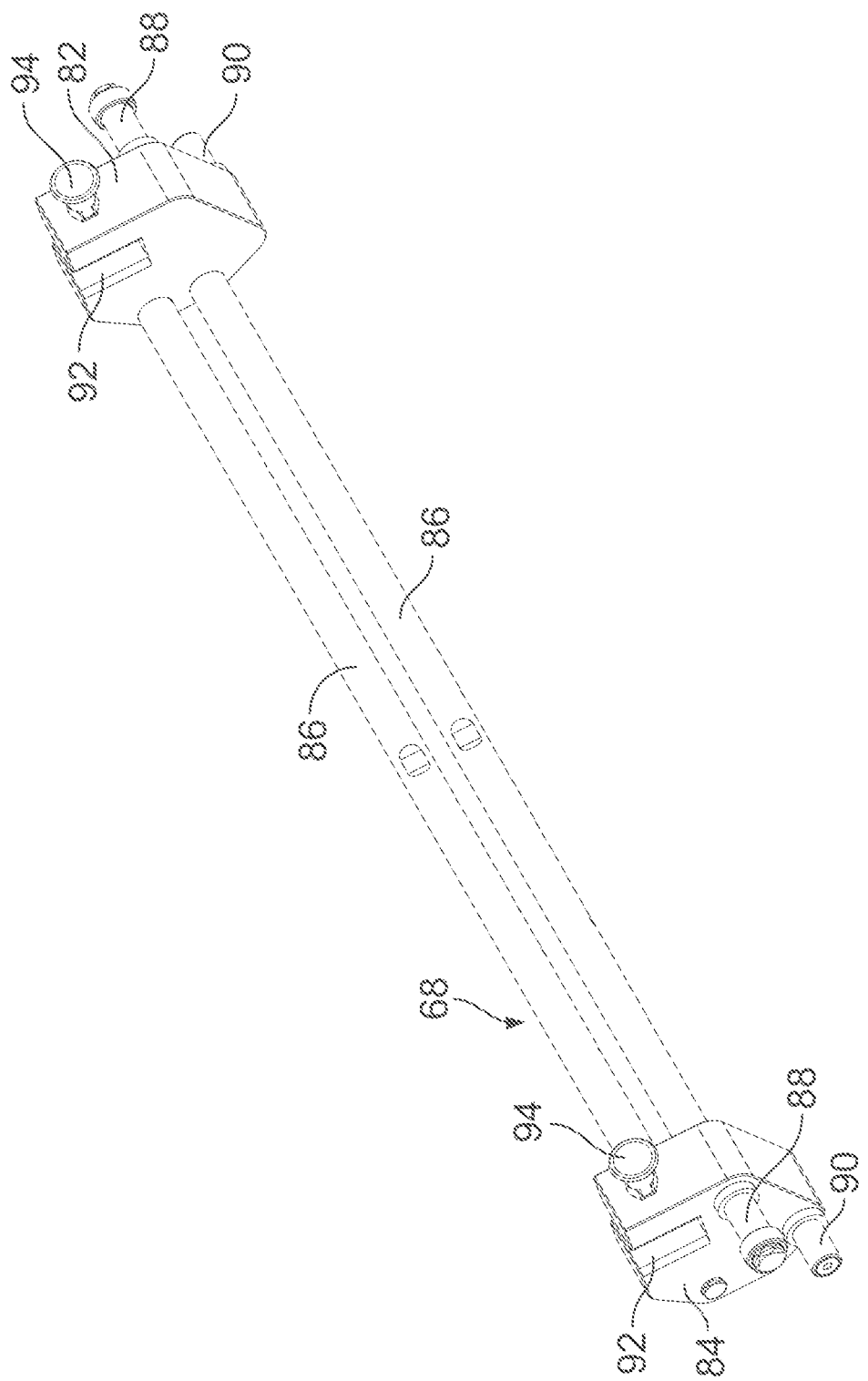
FIG. 7 is a rear perspective view of a bridge of the product gate assembly.
Figure 11:
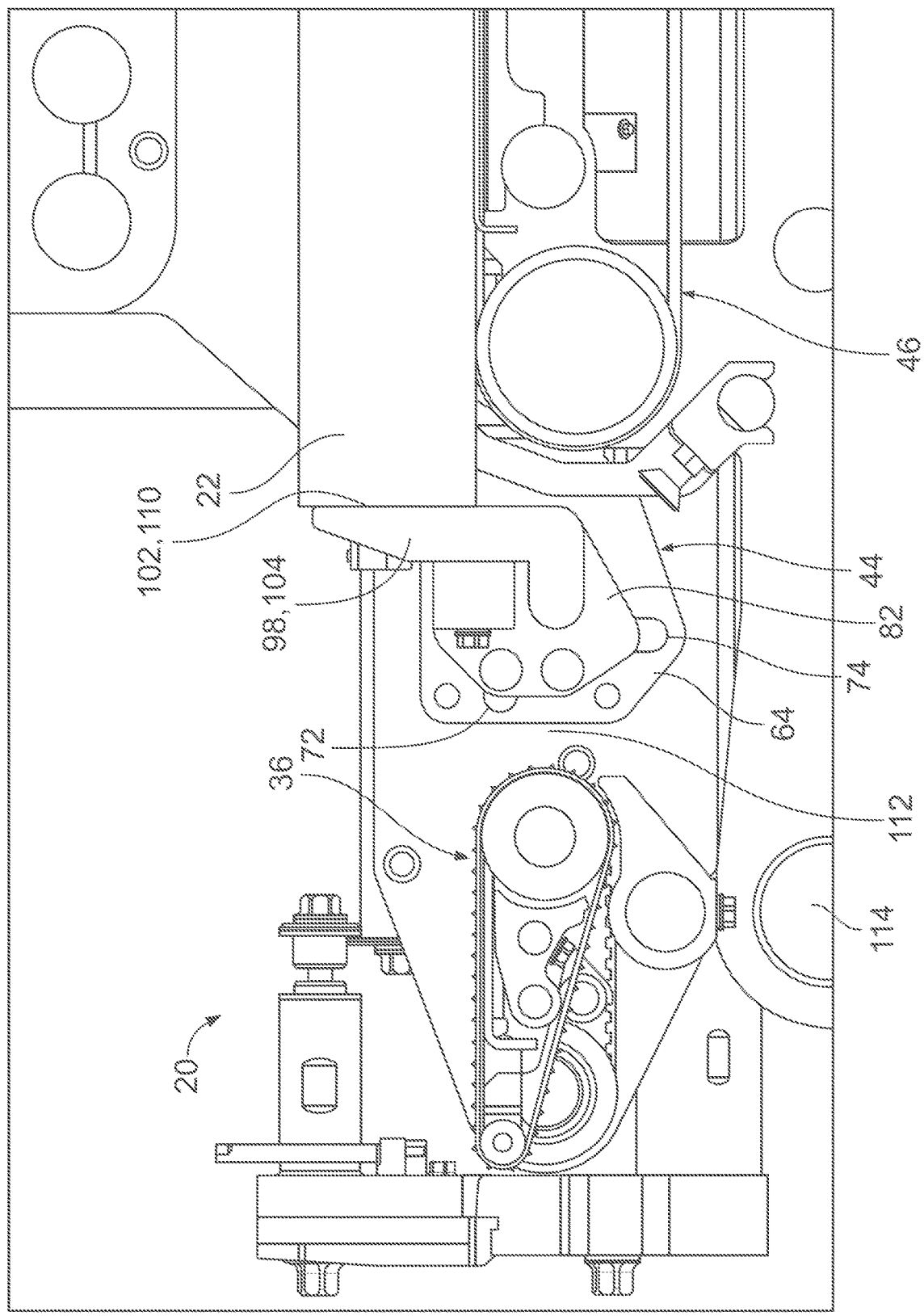
FIGS. 11 and 12 are partial cross-sectional views of the food product slicing apparatus showing the product gate assembly in various positions.
Figure 12:
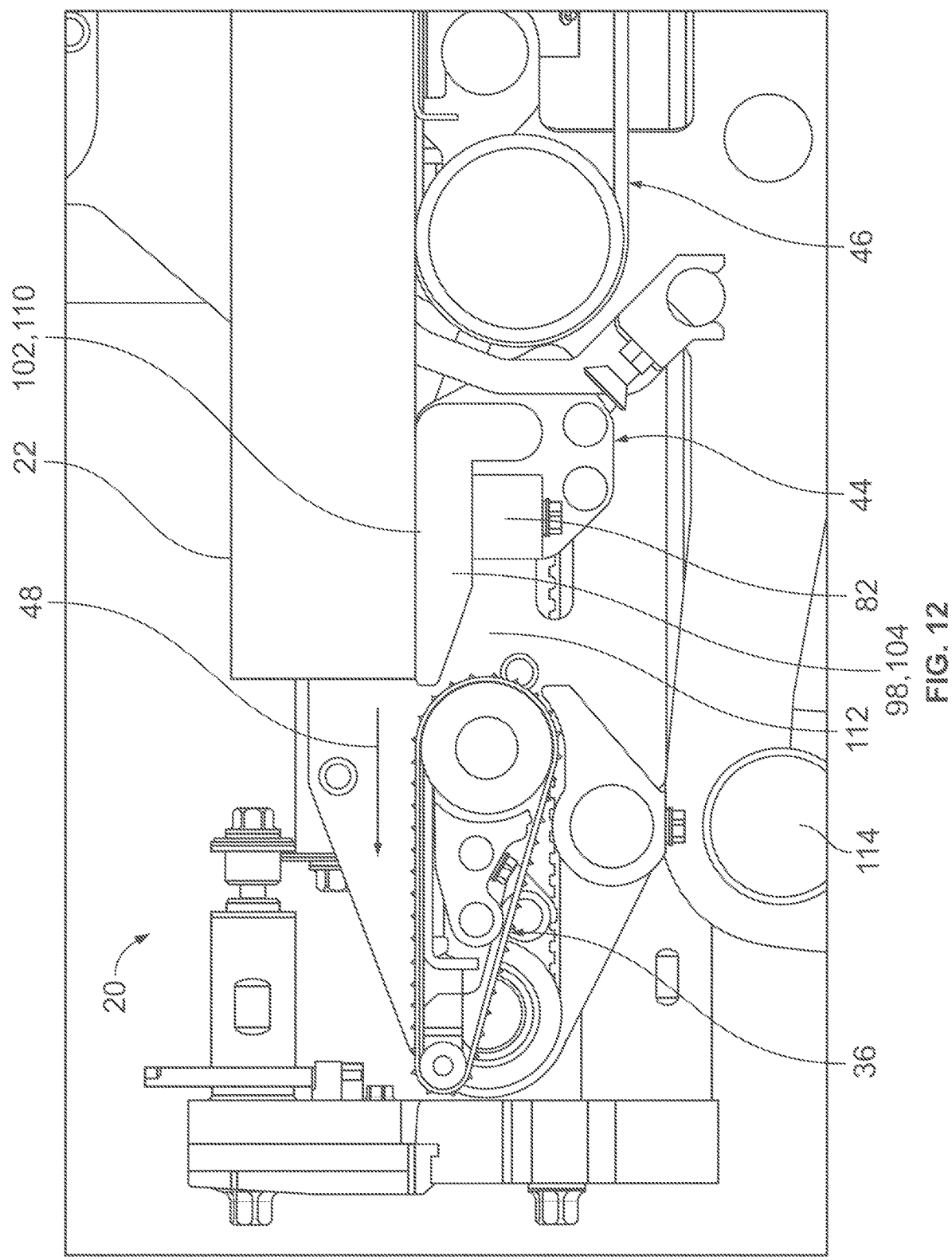

The bridge 68, see FIG. 7, spans the distance between the cam plates 64, 66. In an embodiment, the bridge 68 includes first and second blocks 82, 84 which are coupled together by at least one bar 86. Each block 82, 84 has first and second spaced apart shaft mounted rotatable rollers 88, 90 extending therefrom; the first roller 88 seats within the first cam track 72 of the respective cam plate 64, 66 and the second roller 90 seats within the second cam track 74 of the respective cam plate 64, 66. The rollers 88, 90 are parallel to each other and parallel to the bar(s) 86. The first rollers 88 are aligned with each other, and the second rollers 90 are aligned with each other. When the product gate assembly 44 is in an up position as shown in FIGS. 8 and 11, the first rollers 88 are at the upstream ends 72a of the first cam tracks 72 and the second rollers 90 are proximate to the upper ends 74a of the second cam tracks 74. When the product gate assembly 44 is in a down position as shown in FIGS. 9 and 12, the first rollers 88 are at the downstream ends 72b of the first cam tracks 72 and the second rollers 90 are proximate to the upper ends 74a of the second cam tracks 74. When the product gate assembly 44 is in an intermediate position as shown in FIG. 10, the first rollers 88 are at the midpoints of the first cam tracks 72 and the second rollers 90 are at the lower ends 74b of the second cam tracks 74. The bridge 68 pivots and linearly translates between these positions relative to the sliding cam plates 64, 66 in a camming motion by actuation of the actuators 60, 62. A recess 92 is provided in each block 82, 84 and extends from an upper surface of each block 82, 84 (this being defined in the up position for ease in explanation). The bar(s) 86 is proximate to the downstream end of the food product blocks 22 and the recesses 92 are upstream of the bar(s) 86 (this being defined in the up position for ease in explanation). A lock 94 is seated within a through bore which extends from an upstream face of each block 82, 84 to the respective recess 92 (this being defined in the up position for ease in explanation). The lock 94 can be pulled out of the respective recesses 92 without disengaging the lock 94 from the food product blocks 22. In an embodiment, the locks 94 are spring-loaded pins. In another embodiment, the locks 94 are screws.

Figure 2:
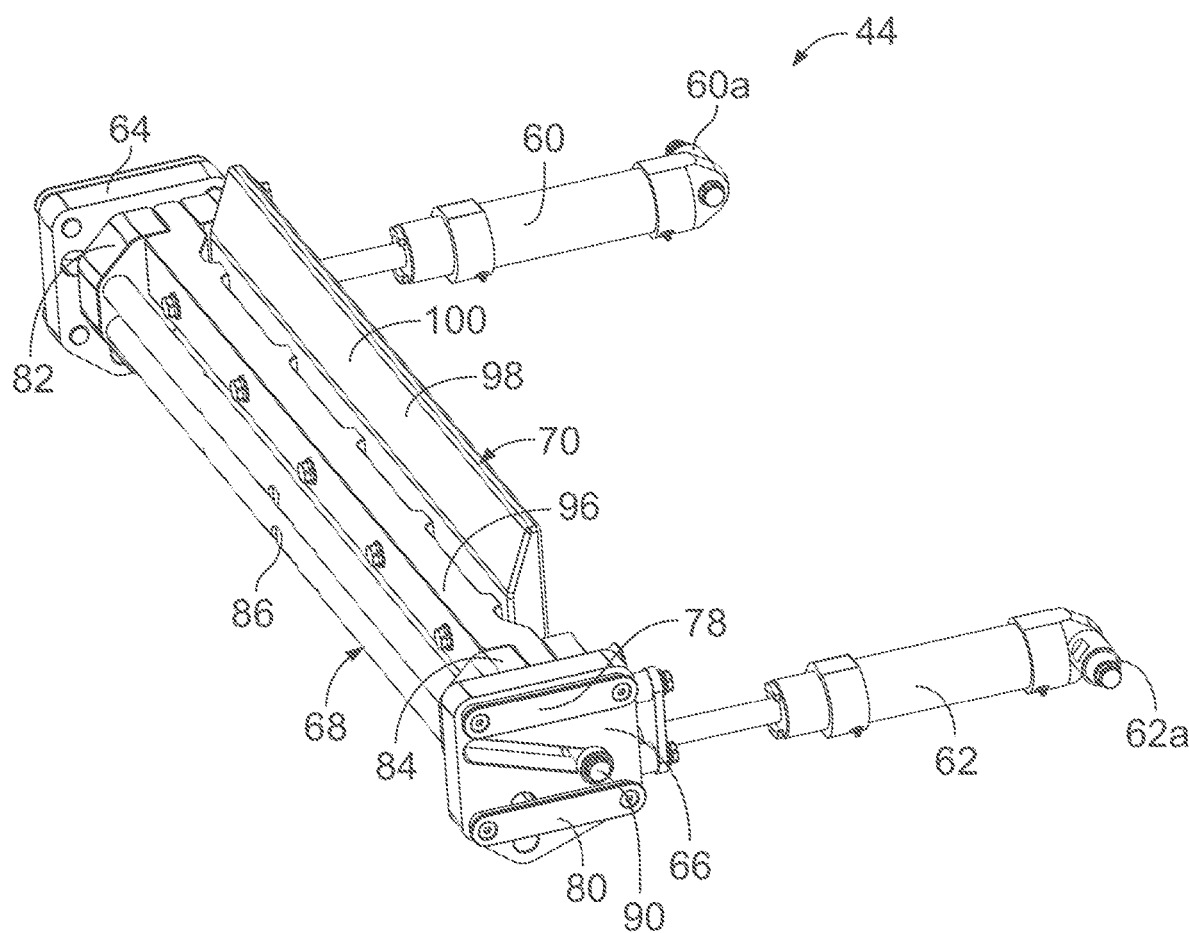
FIGS. 2 and 3 are front and rear perspective views of a first embodiment of the product gate assembly.
Figure 4:
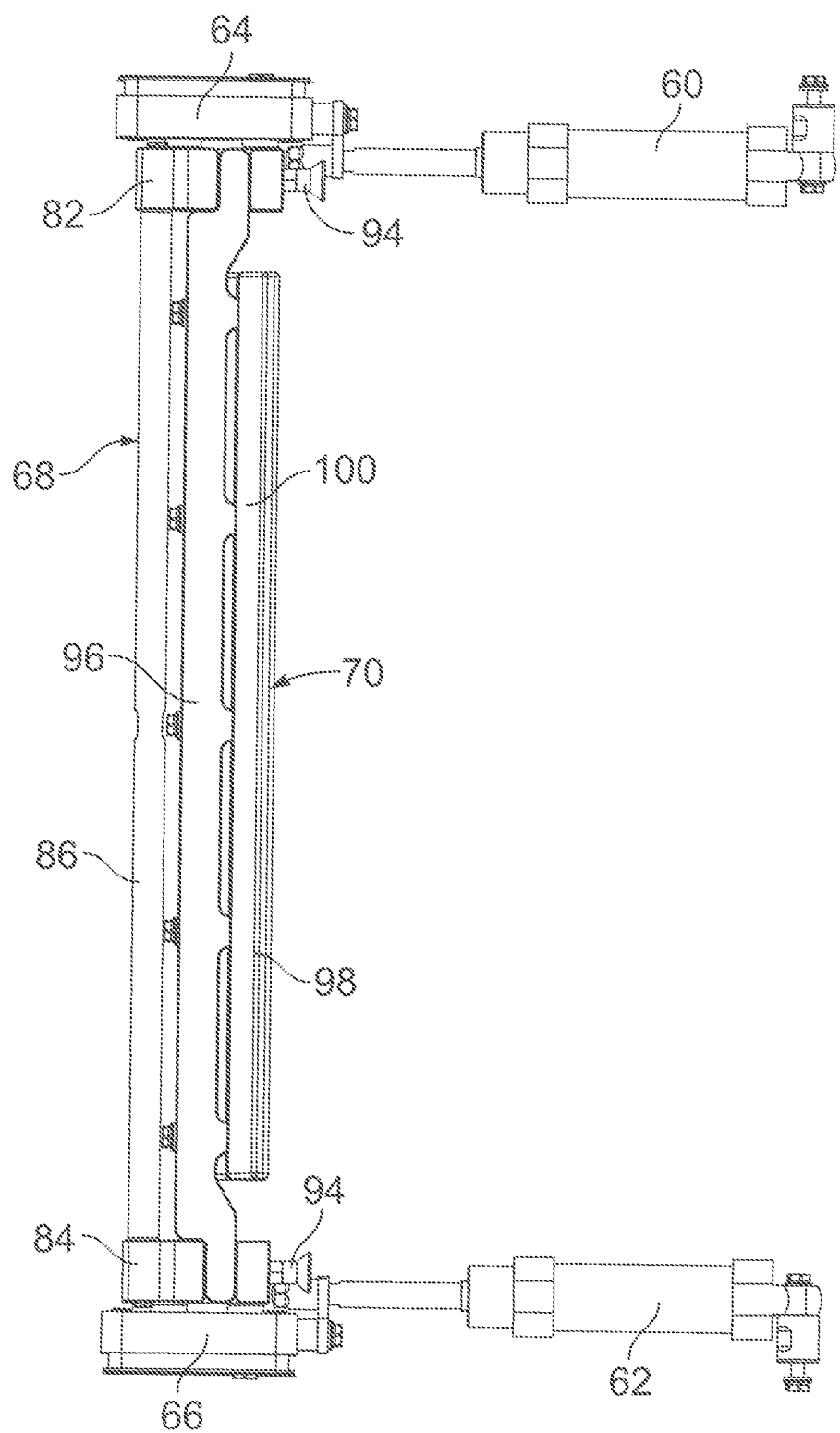
FIG. 4 is a top plan view of the product gate assembly of FIGS. 2 and 3.
Figure 5:
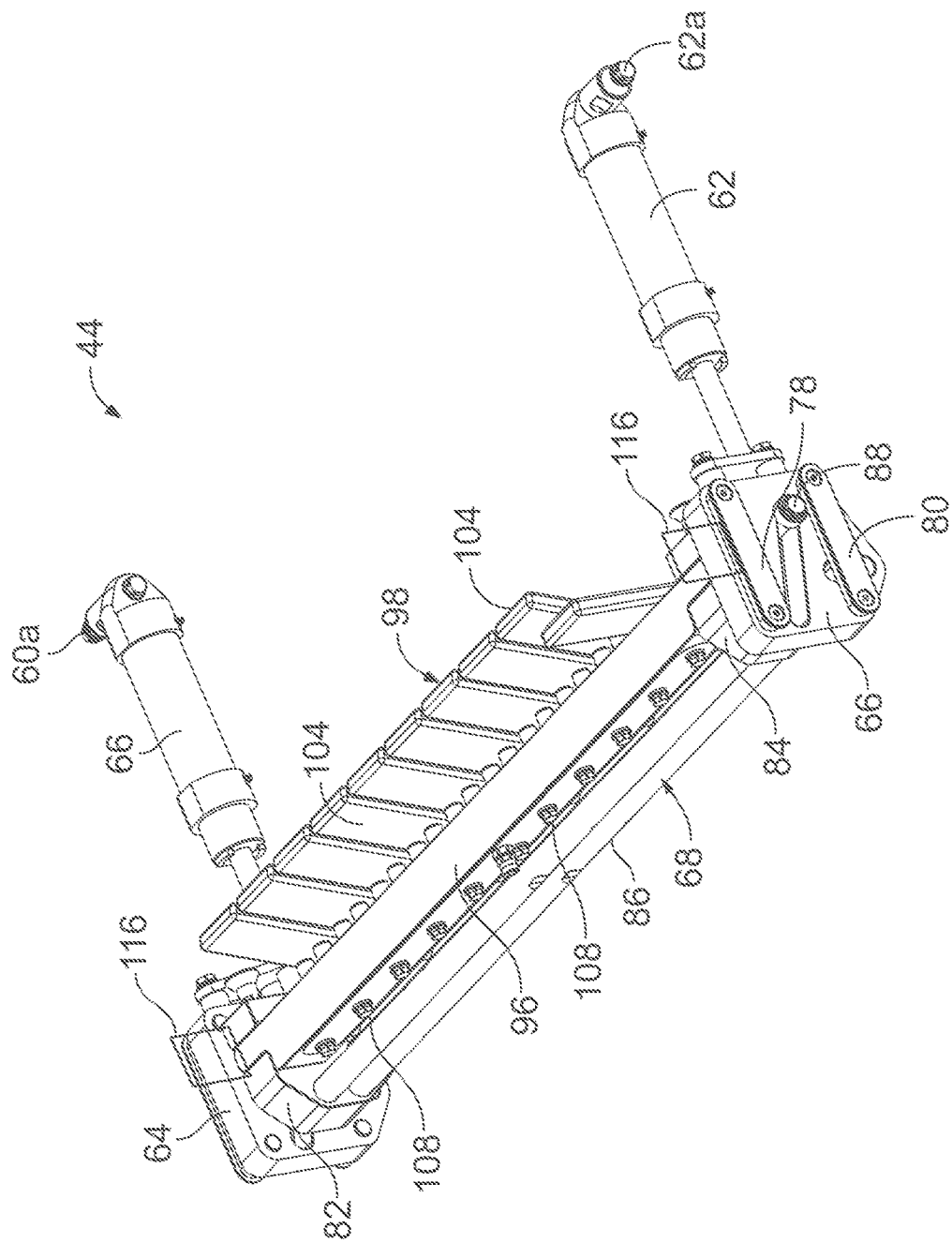
FIGS. 5 and 6 are front and rear perspective views of a second embodiment of the product gate assembly.

As shown in FIGS. 2, 4 and 5, the blade cartridge 70 includes a mounting plate 96 which is seated within the recesses 92 so as to be positioned upstream of the bar(s) 86 (this being defined in the up position for ease in explanation) and which extends between the food product blocks 22, and a stop member 98 which extends from the mounting plate 96 and between the food product blocks 22. The locks 94 can be withdrawn from the recesses 92 to allow the mounting plate 96 to be inserted into the recesses 92, and then reengaged to affix the mounting plate 96 to the bridge 68. The stop member 98 extends upwardly (this being defined in the up position for ease in explanation) from the mounting plate 96. The stop member 98 can take a variety of forms. Since the mounting plate 96 and stop member 98 are mounted on the bridge 68, the mounting plate 96 and stop member 98 pivot and linearly translate between the positions in a camming motion with the bridge 68 by actuation of the actuators 60, 62.

Figure 3:
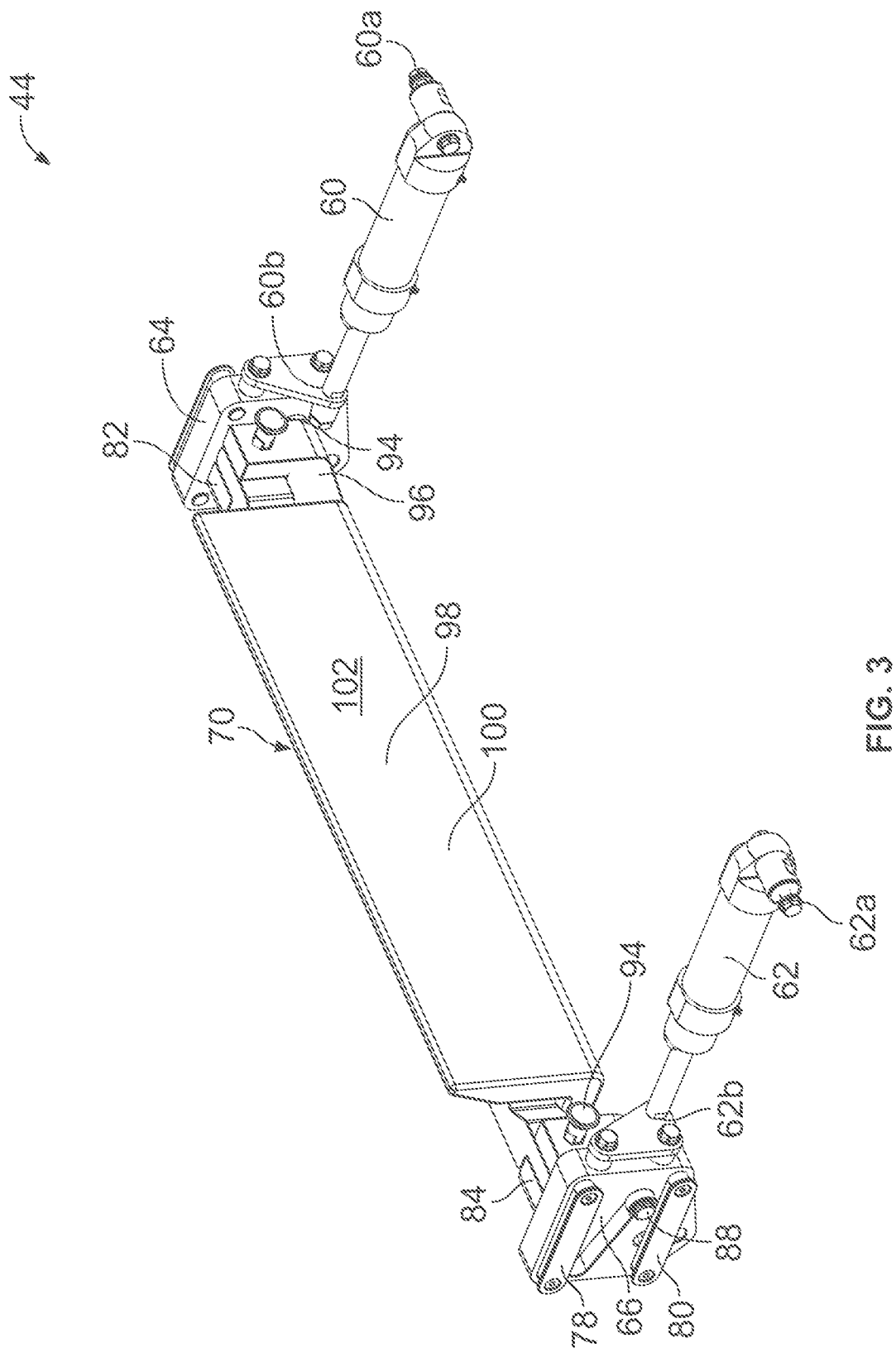

As shown in FIGS. 2-4, the stop member 98 is a solid elongated body 100 that extends between the food product blocks 22. The body 100 of the stop member 98 has a planar face 102 which is opposite to the mounting plate 96. The stop member 98 is fixed in position relative to the mounting plate 96. In an embodiment, the stop member 98 is integrally formed with, and non-removable from, the bridge 68.

Figure 6:
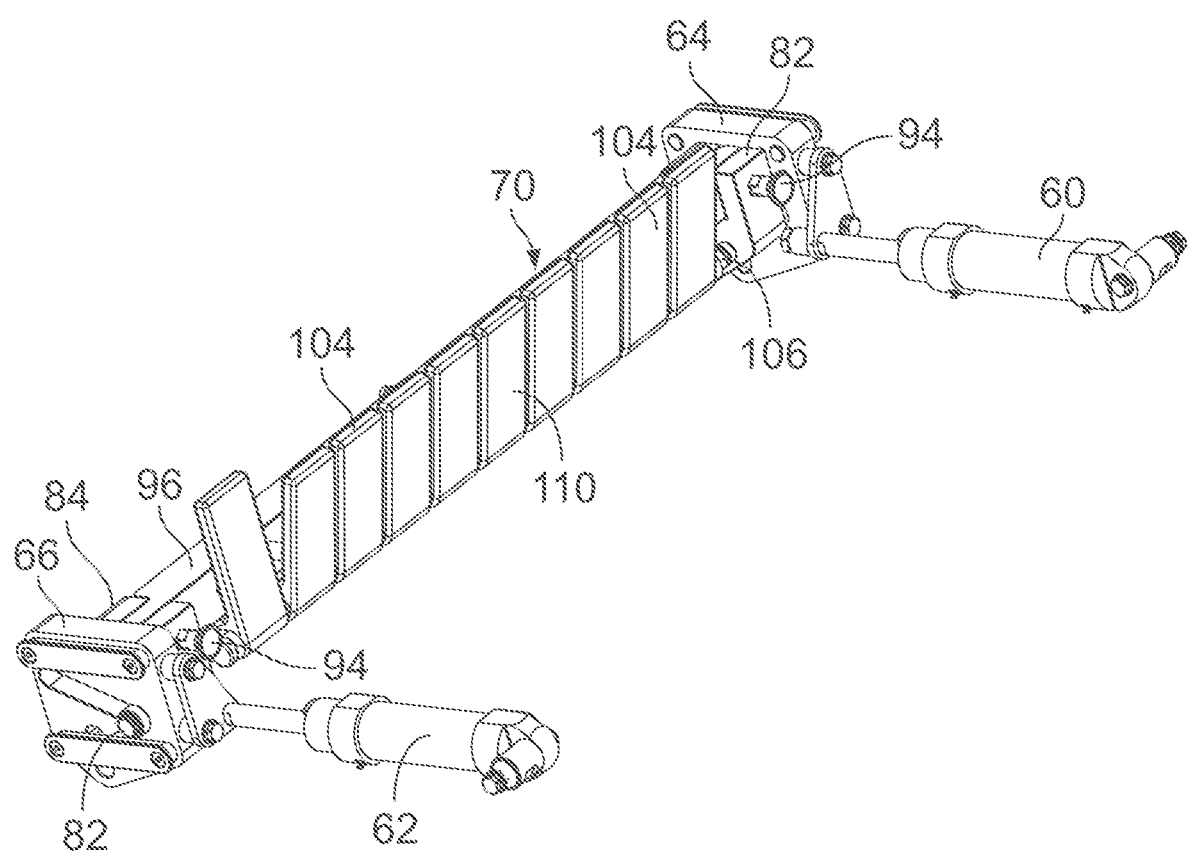

As shown in FIGS. 5 and 6, the stop member 98 is a plurality of side-by-side bodies 104 pivotally mounted on a shaft 106 which is coupled to the mounting plate 96. The bodies 104 may be formed as elongated fingers. A downstream surface of each body 104 engages an actuator 108 which extends from a manifold which forms part of the mounting plate 96. The actuators 108 may be pneumatic cylinders. Each body 104 has a planar face 110 which is opposite to the mounting plate 96.

In the up position as shown in FIG. 11, the stop member 98 is spaced from the lower drive assembly 36 such that a gap 112 is provided between the product gate assembly 44 and the lower drive assembly 36. An upper end of the stop member 98 is above the plane defined by the planar upper surfaces of the lower drive assembly 36. The planar face 102 or planar faces 110 of the stop member 98 is perpendicular to the planar upper surfaces of the lower drive assembly 36 and the planar upper surfaces of the tray 46. In the down position as shown in FIG. 12, the stop member 98 pivots such that the planar face 102 or planar faces 110 of the stop member 98 is aligned with the plane defined by the planar upper surfaces of the lower drive assembly 36 and the planar upper surfaces of the tray 46, and substantially closes the gap 112.

The tray 46 is pivotally mounted to the frame 34 around pivot 114 and can pivot from a horizontal position to an angled position. When the tray 46 is in the horizontal position, the food product blocks 22 are loaded onto the tray 46. The tray 46 is pivotable relative to the lower and upper drive assemblies 36, 38, the shear edge and slicing station 42, and the product gate assembly 44 to move the tray 46 into an angled (non-horizontal position) to align with the food travel path 48. The tray 46 may include a plurality of endless drive belts, one for each food product block 22. The endless drive belts define planar upper surfaces upon which food product blocks 22 will translate. The drive belts may include a tactile surface configured to engage surfaces of the food product blocks 22.

Now that the specifics of the components of the food product slicing apparatus 20 have been described, the operation of the food product slicing apparatus 20 is described.

Initially, the food product slicing apparatus 20 is in a load position as shown to facilitate loading of food product blocks 22 onto the tray 46 which is horizontal. The grippers 50 of the gripper assembly 40 are spaced from the upstream end of the upper drive assembly 38. The lower surface of the food product blocks 22 seats on the tray 46. The product gate assembly 44 is in the up position.

Once the food product blocks 22 are loaded onto the tray 46, the tray 46 is rotated upward around pivot 114, such that the planar upper surfaces of the tray 46 are aligned with the planar upper surfaces of the lower drive assembly 36, and the food product blocks 22 engage the upper drive assembly 38. Next, the upper drive assembly 38 and the conveyors on the tray 46 are actuated to drive the food product blocks 22 into engagement with the stop member 98 of the product gate assembly 44. Thereafter, the gripper assembly 40 is engaged to move the grippers 50 into engagement with the rear ends of the food product blocks 22. The upper drive assembly 38, the conveyor on the tray 46 and the gripper assembly 40 are then driven to further engage the food product blocks 22 against the stop member 98 and to compress the food product blocks 22. The food product blocks 22 engage an upper portion of the stop member 98 as shown in FIG. 11. A sensor(s) (not shown) may be provided to determine the length of the food product blocks 22 and communicate this information to the control system 30.

In the embodiment of FIGS. 2-4, the front ends of the food product blocks 22 will align against the stop member 98. The gripper assembly 40 can have grippers 50 that are individually translated so that the individual food product blocks 22 are all moved into engagement with the stop member 98. The tray 46 supports the food product blocks 22 from below, the stop member 98 supports the food product blocks 22 from the front, and the upper drive assembly 38 engages the upper surfaces of the food product blocks 22, thereby limiting forward movement of the food product blocks 22 in a forward direction and preventing the food product blocks 22 from moving toward the slicing station 42. In the embodiment of FIGS. 5 and 6, the bodies 104 start in the pivoted position under actuation of the actuators 108, and will pivot toward the mounting plate 96 as the differing lengths of food product blocks 22 engage with the product gate assembly 44. Sensors 116 are mounted on the frame 34 or the cam plates 64, 66 and provide information to the control system 30 that at least one of the food product blocks 22 has engaged with one or more of the bodies 104. The sensors 116 may provide a light beam which, when interrupted, indicates that one or more of the bodies 104 have pivoted by engagement with at least one or more of the food product blocks 22. When used with a single drive gripper assembly 40, this allows for the grippers to align the rear ends of the food product blocks 22, and to provide a datum of the position of the rear ends of the food product blocks 22.

Once the food product blocks 22 engage with the stop member 98 of the product gate assembly 44, the actuators 60, 62 are engaged to move the stop member 98 to the down position. When in the down position, the planar face 102 or planar faces 110 of the stop member 98 aligns with the planar upper surfaces of the tray 46 and aligns with the planar upper surfaces of the lower drive assembly 36. The stop member 98 substantially spans the gap 112 between the tray 46 and the lower drive assembly 36 to support the food product blocks 22 as the food product blocks 22 pass from the tray 46 to the lower drive assembly 36. The food product blocks 22 engage with the full length of the planar face 102 or planar faces 110 of the stop member 98 as the food product blocks 22 pass from the tray 46 to the lower drive assembly 36.

The upper drive assembly 38 is engaged to move the food product blocks 22 along their feed paths 48 toward and along the lower drive assembly 36. The food product blocks 22 pass over the planar face 102 or planar faces 110 of the stop member 98 of the product gate assembly 44 as food product blocks 22 translate onto the lower drive assembly 36. The upper drive assembly 38 drives the food product blocks 22 into engagement with the lower drive assembly 36. Upon engagement of the food product blocks 22 with the belts of the lower drive assembly 36, the food product blocks 22 are driven along their respective feed paths 48 by both the lower and upper drive assemblies 36, 38. Sets of lower and upper belts of the upper and lower drive assemblies 36, 38 associated with individual food product blocks 22 may be driven independent of other sets of upper and lower belts of the upper and lower drive assemblies 36, 38 to drive food product blocks 22 along their feed paths 48 at different rates.

The pressure adjustment assemblies may be activated to apply varying pressures to top surfaces of the food product blocks 22 near the front ends of the food product blocks 22 to inhibit movement of the front ends of the food product blocks 22 prior to inserting into the shear edge of the shear edge and slicing station 42. The pressure adjustment assemblies assist with ensuring the food product blocks 22 are properly aligned with the apertures in the shear edge to facilitate insertion of the food product blocks 22.

In the embodiment with the bodies 104 shown in FIGS. 5 and 6, the front ends of the food product blocks 22 that are longer than all of the food product blocks 22 forms a front "butt" end. Once sliced by the slicing station 42, this sliced front butt end is appropriately processed.

When the food product blocks 22 are sufficiently advanced along their feed paths 48 into the slicing station 42, the tray 46 may return back to its initial horizontal position. The lower and upper drive assemblies 36, 38 continue to drive the food product blocks 22 along their feed paths 48 into the slicing station 42. Upon loading of new food product blocks 22, the tray 46 is rotated upward, but is positioned below the feed paths 48 and displaced below the upper drive assembly 38. This spacing of the new food product blocks 22 and the upper drive assembly 38 allows retraction of the grippers 50 to a rear of the new food product blocks 22.

The food product slicing apparatus 20 does not facilitate slicing of the entire food product blocks 22. The remaining, unsliced portion of a food product block 22 is referred to as a "butt". Upon completion of the slicing operation of the food product blocks 22, the lower and upper drive assemblies 36, 38 reverse driving directions and the butts of the food product blocks 22 move rearward away from the slicing station 42 while still being grasped by the grippers 50. The product gate assembly 44 is moved to the up position to expose the gap 112. As the butts pass over the gap 112, the grippers 50 release the butts and the butts drop through the gap 112 for collection. Alternatively, the product gate assembly 44 can be left in the down position and after the butts pass over the product gate assembly 44, the grippers 50 release the butts and the butts drop through a gap in front of the tray 46 for collection.

The stop member 98 has a height which is low profile and allows the housing 52 to pass over the stop member 98 when in the up position. Because of the camming motion of the stop member 98, the planar face 102 or planar faces 110 of the stop member 98 is moved to align with the lower drive assembly 36 and the tray 46 when in the down position to span the gap 112. This allows for a longer run length in the down position, than what is required in the up position.

While the rollers 88, 90 are described as being on the blocks 82, 84 and the cam tracks 72, 74 are described as being in the cam plates 64, 66, the rollers 88, 90 can be on the cam plates 64, 66 and the cam tracks 72, 74 in the blocks 82, 84.

Figure 13:
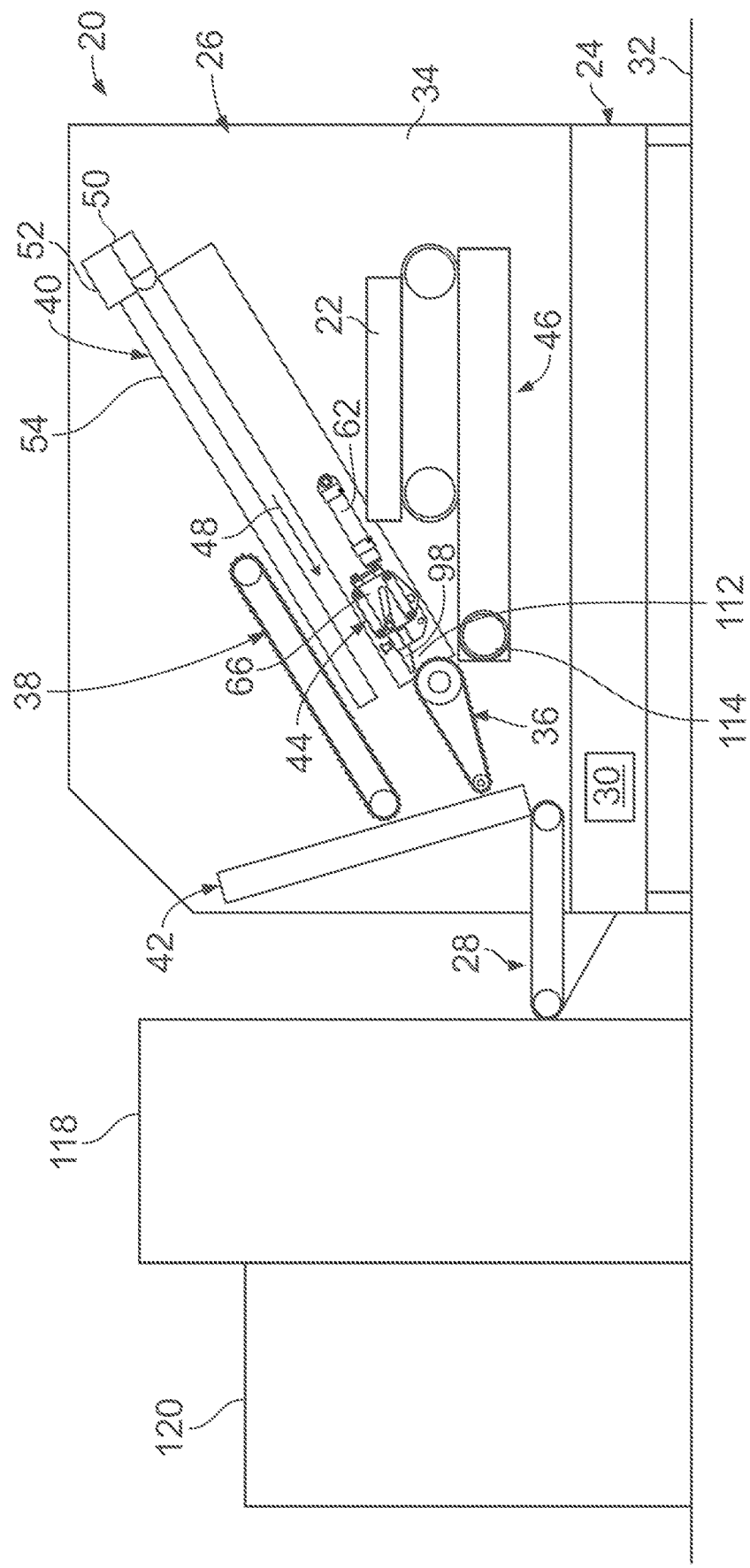
FIG. 13 is a schematic representation of the food product slicing apparatus as part of a line of processing equipment.

The food product slicing apparatus 20 may form part of a line of food processing equipment which contains other pieces of equipment, such as for example, a conventional packaging assembly 118, a conventional labeling assembly 120, etc., see FIG. 13.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

The invention claimed is:

1. A food product slicing apparatus comprising:
a frame;
a tray mounted on the frame having a surface on which a food product block is supported;
a product gate assembly mounted on the frame including a stop member, a pair of actuators, each actuator having a first end fixed to the frame, a pair of cam plates coupled to second ends of the actuators for movement, each cam plate being configured to slide relative to the frame, a bridge coupling the cam plates together, a blade cartridge on the bridge, and a pair rollers on each cam plate or on opposite ends of the bridge, and a pair of cam tracks on the other of each cam plate or the opposite ends of the bridge, wherein the rollers seat within the cam tracks and are configured to move along the cam tracks, wherein the bridge and blade cartridge are configured to rotate relative to the cam plates from an up position and a down position using a first camming action upon movement of the cam plates by the actuators in a first direction, wherein the bridge and blade cartridge are configured to rotate relative to the cam plates from the down position to the up position using a second camming action upon movement of the cam plates by the actuators in a second direction, wherein the stop member is angled relative to the tray and has a surface against which a front end of the food product engages in the up position, and wherein the surface of the stop member aligns with the surface of the tray such that the food product block passes thereover in the down position, and wherein the stop member is downstream of the tray in the up position and in the down position; and
a gripper assembly mounted on the frame and configured to grip a rear ends end of the food product block.

2. The food product slicing apparatus of claim 1, in combination with a second food processing assembly.

3. The food product slicing apparatus of claim 1, wherein the blade cartridge includes a mounting plate which is attached to the bridge and the stop member which extends from the mounting plate.

4. The food product slicing apparatus of claim 3, wherein the stop member is fixed in position relative to the mounting plate.

5. The food product slicing apparatus of claim 3, further including a sensor which senses positions of the stop member.

6. The food product slicing apparatus of claim 5, wherein the stop member comprises a plurality of side-by-side bodies, and further comprising a sensor which senses positions of the bodies.

7. A food product slicing apparatus comprising:
a frame;
a tray mounted on the frame and configured to support a food product block;
a product gate assembly mounted on the frame and configured to support a front end of the food product block, the product gate assembly including a pair of actuators, each actuator having a first end fixed to the frame, a pair of cam plates coupled to second ends of the actuators for movement, each cam plate being configured to slide relative to the frame, a bridge coupling the cam plates together, a blade cartridge on the bridge, and a pair rollers on each cam plate or on opposite ends of the bridge, and a pair of cam tracks on the other of each cam plate or the opposite ends of the bridge, wherein the rollers seat within the cam tracks and are configured to move along the cam tracks, wherein the bridge and blade cartridge are configured to rotate relative to the cam plates from an up position to a down position using a first camming action upon movement of the cam plates by the actuators in a first direction and wherein the bridge and blade cartridge are configured to rotate relative to the cam plates from the down position to the up position using a second camming action upon movement of the cam plates by the actuators in a second direction; and a gripper assembly mounted on the frame and configured to grip a rear end of the food product block.

8. The food product slicing apparatus of claim 7, wherein the blade cartridge is removably coupled to the bridge by a lock.

9. The food product slicing apparatus of claim 7, in combination with a second food processing assembly.

10. The food product slicing apparatus of claim 7, wherein the blade cartridge includes a mounting plate which is attached to the bridge and a stop member which extends from the mounting plate.

11. The food product slicing apparatus of claim 10, wherein the stop member is fixed in position relative to the mounting plate.

12. The food product slicing apparatus of claim 10, wherein the mounting plate is seated within a recess of the bridge.

13. The food product slicing apparatus of claim 10, wherein the mounting plate is a bar around which the stop member pivots.

14. The food product slicing apparatus of claim 13, further including a sensor which senses positions of the stop member.

15. The food product slicing apparatus of claim 13, further including an actuator configured to position to the stop member into a pivoted position relative to the bridge.

16. The food product slicing apparatus of claim 13, wherein the stop member comprises a plurality of side-by-side bodies mounted on the bar.

17. The food product slicing apparatus of claim 16, further including a sensor which senses positions of the bodies.

18. The food product slicing apparatus of claim 16, further including a plurality of actuators configured to position to the bodies into pivoted positions relative to the bridge.

19. The food product slicing apparatus of claim 7, wherein first ones of the cam tracks are linear and each has an upstream end which is generally longitudinally aligned with a centerline of the respective actuator to which it is attached and has a downstream end spaced at an angle relative to a line parallel to the centerline of the respective actuator, and second ones of the cam tracks are linear and each extends perpendicular to the centerline of the respective actuator to which it is attached.

20. The food product slicing apparatus of claim 19, wherein the second cam track is below the respective first the cam track.

21. The food product slicing apparatus of claim 19, wherein the first cam tracks are angled at 40 degrees relative to the centerline of the respective actuator to which it is attached.

22. The food product slicing apparatus of claim 19, wherein an upper end of each second cam track is positioned at approximately a midpoint of the first cam track and is generally longitudinally aligned with the centerline of the respective actuator to which it is attached.

23. A product gate assembly for a food product slicing apparatus, comprising:

a pair of actuators, each actuator having a first end fixed to a frame of the food product slicing apparatus;

a pair of cam plates coupled to second ends of the actuators for movement, each cam plate being configured to slide relative to the frame of the food product slicing apparatus;

a bridge coupling the cam plates together;

a blade cartridge on the bridge; and a pair rollers on each cam plate or on opposite ends of the bridge, and a pair of cam tracks on the other of each cam plate or the opposite ends of the bridge, wherein the rollers seat within the cam tracks and are configured to move along the cam tracks, wherein the bridge and blade cartridge are configured to rotate relative to the cam plates upon movement of the cam plates by the actuators.

24. The product gate assembly of claim 23, wherein first ones of the cam tracks are linear and each has an upstream end which is generally longitudinally aligned with a centerline of the respective actuator to which it is attached and has a downstream end spaced at an angle relative to a line parallel to the centerline of the respective actuator, and second ones of the cam tracks are linear and each extends perpendicular to the centerline of the respective actuator to which it is attached.

25. The product gate assembly of claim 23, wherein the second cam track is below the respective first cam track, and an upper end of each second cam track is positioned at approximately a midpoint of the first cam track and is generally longitudinally aligned with the centerline of the respective actuator to which it is attached.

* * * * *